United States Patent Office 3,404,288
Patented Oct. 1, 1968

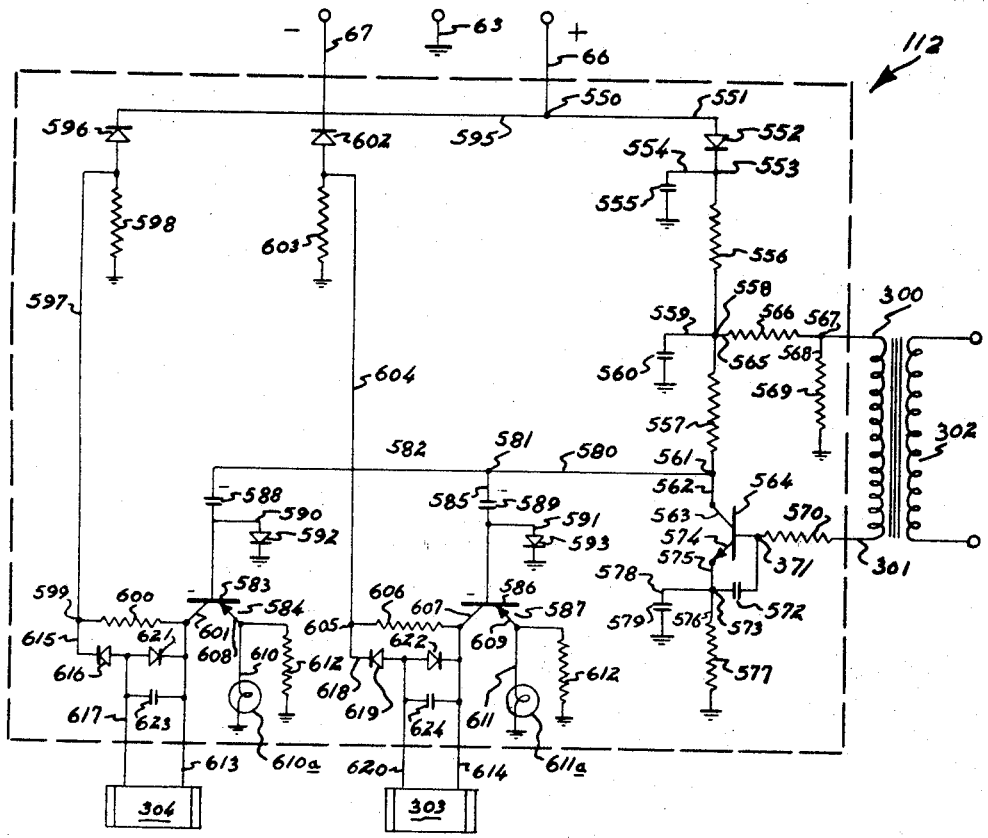

3,404,288
ELECTRONIC PHASE COMPARATOR SENSING MEANS
Jack D. Noble, Lafayette, Calif., and William Fleming, 2024 10th Ave., Oakland, Calif. 94606; said Noble assignor to said Fleming
Original application Oct. 4, 1960, Ser. No. 60,510, now Patent No. 3,259,199, dated July 5, 1966. Divided and this application Oct. 21, 1965, Ser. No. 516,811
2 Claims. (Cl. 307—232)

ABSTRACT OF THE DISCLOSURE

An electronic sensing device for providing an output signal responsive to the comparison between two input signals is disclosed. The device comprises a transformer with power leads from taps thereon adapted to carry current of opposite phase relationship, a rectifying means of opposite phase sensitivity in each power lead forming an intermittent pulsing voltage of opposite phase with each power lead being connected to a relay transistor. Means are provided for receiving two separate input signals of alternating current in bucking relationship and providing a resultant alternating current which is amplified. The positive pulses of this resultant alternating current are filtered out and the negative pulses are applied to the bases of the relay transistors. When the negative input impulse of the amplified alternating current is applied to the transistors it will be in-phase with and match the intermittent pulses on one of them, depending on the relative strength of each bucking voltage, thereby producing an output from the in-phase transistor.

---

This application is a divisional application of the parent application Ser. No. 60,510, filed on Oct. 4, 1960, and now U.S. Patent No. 3,259,199.

This invention relates to an electronic sensing device particularly adaptable for use in a batching control system, in which several ingredients are weighed out simultaneously in any of various preselected combinations and proportions.

In its novel arrangement of elements, the batch system of the parent application employs highly accurate potentiometers on which resistance values are set in advance to represent the weight of each ingredient of a predetermined batch formula. A servo-loop system is used in setting these potentiometers. When the preset potentiometers are switched into the batching circuit, a master scale-drum potentiometer is then driven by a motor in the servo-loop system. The motor driving the master scale-drum potentiometer is connected through the servo-loop system to a servo-transmitter driven by the dial scale on each of the weigh-batchers, and these scales thus act through the servo-loop system to send a voltage signal from the scale-drum potentiometer which is proportional to the actual amount of material in a weigh-hopper at any given instant. To control the cutoff of material flowing into the weigh-hopper, voltages through the preset potentiometers are compared electrically with the voltage obtained through the master scale-drum potentiometer. The general object of the present invention is to provide a novel "batch-brain" or electronic sensing device for accomplishing this control function. In the case of the batching system the reaction of this batch-brain to the comparison of the voltages through the preset potentiometer and the master scale potentiometer controls the closing of the inlet cut-off valve to the particular weigh-hopper and energizes a switch to close a circuit to the next weigh-hopper to start the weighing-out of the next ingredient. This cut-off feature of this batch-brain or sensing device is accurate and reliable, and is provided in addition to the constant visual reference of the weight of each material being weighed out, afforded by the scale indicator.

Another object of the present invention is to provide a novel electronic sensing or switching means for energizing circuits which is responsive to an unbalance of two voltages, one obtained by passing current through a preset resistance and the other by passing current through a resistance that varies according to some other variable such as the actual weight of material in a weigh-hopper. This switching means can be adapted to provide a visual indication of an overweight or underweight condition in a particular hopper.

Other objects and advantages will appear from the following description of the invention and the drawing which is a detailed circuit diagram of an electronic sensing device embodying the principles of the present invention.

Referring to the sole drawing, a schematic circuit diagram is shown of an electronic sensing device or batch-brain 112 which may be particularly adaptable for use in a materials batching control system. Power (e.g., 26 volts, 400-cycle), is supplied to the device 112 through a pair of leads 66 and 67 from a center-tapped power transformer (not shown), the center-tap 63 being grounded so that each of the leads 66 and 67 supplies an alternating current of equal voltage. However, since these voltages are supplied from opposite ends of the transformer, they are in an opposite-phase relationship. As shown, the first power-lead 66 branches at a junction 550. One lead 551 from the junction 550 goes through a diode-rectifier 552 to a junction 553, from which a lead 554 extends to ground through a first filter-condenser 555 (e.g., 10 microfarads, 25 volts). The junction 553 also is connected to a resistance capacity filter-network comprising a first resistance 556 (e.g., 1000 ohms), and a second larger resistance 557 (e.g., 15,000 ohms), between which is a junction 558 from which a lead 559 extends to ground through a second filter-condenser 560 (e.g., 10 microfarads, 25 volts). The resistor 557 is connected to a junction 561, which is connected by a lead 562 to the collector 563 of an NPN-type transistor 564 (e.g., 2N169A).

From the junction 558 between the resistors 556 and 557, there is also a lead 565 connected through a relatively large resistance 566 (e.g., 100,000 ohms) to a junction 567, from which another lead 568 passes to ground through a somewhat smaller resistance 569 (e.g., 3900 ohms) to form a voltage-dividing network. This network affords a bias-voltage to the base of the transistor 564 by way of the lead 300 that is connected to the secondary-winding of the input or coupling-transformer 302; the lead 301 is connected through an isolation-resistor 570 (e.g., 470 ohms) and a junction 571. Simultaneously, a considerably higher voltage is being applied on the collector 563 of the transistor 564 through the lead 562 and the 15,000-ohms resistance 557.

A feed-back or regeneration-circuit is provided by connecting the junction 571 through a condenser 572 (e.g., 10 microfarads, 25 volts) to a junction 573. The emitter 574 from the transistor 564 is connected by a lead 575 to the junction 573, from which point a lead 576 goes through a resistance 577 (e.g., 1000 ohms) to ground and a lead 578 goes through a condenser 579 (e.g., 40 microfarads, 4 volts) to ground. The condenser 579 serves to bring the transistor 564 into its proper operating range so that it will function as an audio-amplifier, as will be described below.

The junction-point 561 is also connected by a lead 580 to a junction-point 581. From this junction 581 a first-lead 582 goes through a coupling-condenser 588 (e.g., 10 microfarads and 10 volts) to the base 583 of a first-relay transistor 584, and a second-lead 585 is connected through a coupling-condenser 589 (e.g., 10 microfarads and 10 volts) to the base 586 of a second-relay transistor 587.

Both the relay transistors 584 and 587 are preferably of the PNP-type (e.g., 2N241A). From each lead 582, 585 a lead 590 or 591 goes to ground through a diode-rectifier 592 or 593.

Going back to the junction 550, another lead 595 goes from there to a diode-rectifier 596 which is grounded through a voltage-stabilizing resistance 598 (e.g., 10,000 ohms) and which is connected by a lead 597 to a junction 599. The junction 599 is connected through a resistance 600 (e.g., 3300 ohms) to the collector 601 of the first-relay transistor 584.

The other incoming lead 67 to the batch-brain 112 from the power-transformer 58 supplies voltage through a rectifier 602 which is grounded through a voltage-stabilizing resistance 603 (e.g., 10,000 ohms) and connected by a lead 604 to a junction 605. The junction 605 is connected through a resistance 606 (e.g., 3300 ohms) to the collector 607 of the second-relay transistor 587.

The relay-transistors 584 and 587 each have an emitter 608 or 609, with leads 610 and 611 connected through a stabilizing-resistance 612 to ground.

From the collectors 601 and 607 of the relay-transistors 584, 587, leads 613 and 614 are connected, respectively, to the underweight and overweight relays 304 and 303. The junction-point 599 is also connected to the underweight-relay 304 by a lead 615, a diode 616, and a lead 617. Similarly, the junction 605 is connected to the overweight-relay 303 by a lead 618, diode 619, and lead 620. The diodes 616 and 619 allow passage of negative supply-voltage to their respective relay-coils 304 and 303. Additional diodes 621 and 622 respectively between the leads 617 and 613 and between the leads 620 and 614, which serve to quench the back-EMF-surge which is caused when the relays 304, 303 are de-energized. A large back-surge from the collapse of the magnetic field of these relays would damage the transistors 584 and 587 if the diodes 621 and 622 were not there. Between each of the pair of leads 617 and 613 and the leads 620 and 614 is connected a condenser 623 or 624 (e.g., 10 microfarads, 25 volts), each of which serves as a filtering means to prevent chatter at the frequency of the supply-voltage.

To understand the unique function of the sensing device 112 of the present invention, it must be understood that a phase-relationship exists between the input from the power-transformer and the input from the coupling-transformer 302. Two voltages are supplied to the primary-winding of the transformer 302.

Thus at any given instant, if one such voltage supplied to the primary of the transformer 302 is greater than the other, one end of the primary-winding will be + (plus) and the other end will be − (minus). For example, if at that time a master-scale potentiometer of a batching control system is set at its zero-weight, no resistance condition, and if a material-potentiometer is set at any point upon the scale, for example at 5 volts, then the end of the primary-winding connected to the material-potentiometer becomes positive and the other end of the primary connected to the scale-potentiometer becomes negative. This is exactly what happens in an underweight situation. Conversely, if the scale-potentiometer voltage is greater than the material-potentiometer voltage, an overweight condition arises, and the current at the same relative instant flows in the opposite direction through the primary-winding; thus the phase in the secondary-winding of the transformer 302b is reversed.

In the operation of our sensing device 112, AC-voltage is supplied equally through its output-leads 66 and 67 from a power transformer and in the device 112 the current in these leads is rectified by the diodes 596 and 602 to form a pulsating DC-voltage. Since the voltage from the opposite end-leads of a transformer are always in opposite-phase relationship, the pulsating DC produced is applied to the transistors 584 and 587 in alternate negative half-wave cycles. In other words, the pulses of DC-voltage arrive at the collectors 601 and 607 of the transistors 584 and 587 at exactly the opposite times. Thus, for example, at a particular instant when the voltage in the lead 66 is negative, the voltage in the lead 67 will be positive. Therefore, a negative-voltage will appear at diode 596 and on the collector 601, while the positive voltage coming in via the lead 67 will be blocked by the diode 602 and cannot get through; so there will be no voltage applied to the collector 607 of the transistor 587. On the next half-cycle, the polarities of the leads 66 and 67 will be reversed, and the transistor 587 will be supplied with voltage and the transistor 584 will not.

As described above, the incoming AC-signal supplied through leads 300 and 301 of the coupling-transformer 302 has one-half of its pulse positive and one-half negative, and the phase is dependent on the flow of current through the transformer primary-winding. At the same time, AC-power supplied from the power-lead 66 through the lead 551 is rectified through the diode 552, filtered through the filter network comprising the resistances 556 and 557 and the condensers 555 and 560, producing a direct-current voltage at the junction 558. This direct-current voltage flows through the voltage-divider formed by the resistances 566 and 569 and then out through lead 300 into the secondary of the coupling-transformer 302. The voltage-divider, by virtue of the ratio of the resistance 569 to the resistance 566, produces a bias-voltage which will go through the secondary-winding of the transformer 302 and return to the base of the transistor 564; at the same time, a considerably higher voltage is being applied to the collector 563 through the resistance 557.

Now, the AC-signal applied into the coupling-transformer, due to the imbalance of the master-scale potentiometer 114 and the material-potentiometer 141, causes current to flow one way or another through the primary-winding, resulting in raising or lowering the bias-voltage on the base of the transistor 564. In other words, this input from the coupling-transformer 302b either is added to or subtracted from the actual DC-voltage biased onto the base of the transistor 564, and thereby causes a greater or less flow of current through the emitter 574, to ground. The more current that flows, the more the voltage will drop at the junction 561. Since, that voltage at junction 561 is a fairly high value, it will fluctuate according to how much current is being drawn through the transistor 564, and as it fluctuates it supplies the coupling-condensers 588 and 589, which act as rectifiers and supply negative-voltage only to the bases 583 and 586 of the relay transistors 584, 587. Any stray positive-current at the bases 583 and 586 is passed to ground through the diodes 592 and 593, so that when current flows from the coupling-transformer 302 and the junction 561, a pulsating-DC is applied to the bases 583, 586 of the transistors 584 and 587. Since the phase of these pulses is dependent on the direction of flow through the coupling-transformer 302, in one direction the negative-pulses are in phase with the alternately pulsating DC being supplied to the underweight-relay 304 and when in the opposite direction the phase of the input-voltage is shifted and is in phase with the supply-voltage of the overweight-relay 305. When the supply-voltage to the collector of a transistor is in-phase with the input-voltage to its base, then an output is produced from that transistor. The output-leads 613 and 614 may be connected to the relays 304 and 303, respectively, and current is supplied to operate these relays when the phase-relationship is present to produce an output from one of the relay-transistors 584, 587.

To those skilled in the art to which this invention relates, many changes in construction and widely differing embodiments and applications of the invention will suggest themselves without departing from the spirit and scope of the invention. The disclosures and description herein are purely illustrative and are not intended to be in any sense limiting.

We claim:

1. An electronic sensing device for providing a signal responsive to the comparison between two input signals, said device comprising: an AC power transformer; an end tap connected to a power lead from each end of said power transformer, said end tap power lead adapted to carry current of opposite phase relationship; a rectifying means of opposite phase sensitivity in each of said power leads to form an intermittent pulsing voltage of opposite phase in each power lead; each said power lead being connected to a relay-transistor; means to receive two separate input signals of alternating current to be compared in bucking-relationship, to produce a resultant alternating current; means to amplify said resultant alternating current; means to filter out the positive pulses of said alternating current; means to apply the negative pulses of said amplified alternating current to the bases of said relay transistors; whereby the negative input impulse of said amplified alternating current, when applied to said transistors, will be in-phase with and match the intermittent pulses on one of the transistors depending on the relative strength of each bucking voltage, to produce an output current from the in-phase transistor.

2. An electronic sensing device for providing a signal responsive to the comparison between two input signals, said device comprising: a central power supply; two relay-transistors each having a base and a collector; connected to said central power supply; an AC power transformer, said power transformer having a grounded center-tap and end power-leads adapted to carry current of opposite phase-relationship; a rectifying means of opposite phase sensitivity in each of said power leads to form an intermittent pulsing voltage of opposite phase in each power lead; each said power lead being connected to the collector of one of said relay-transistors; coupling-transformer means to receive two separate input signals of alternating current supplied from said central power supply and connected to opposite ends of said coupling-transformer winding in bucking-relationship, to produce a resultant alternating current output; means to amplify said resultant alternating current output; means to filter out the positive pulses of said alternating current, means to apply the negative pulses of said amplified alternating current to the bases of said relay-transistors; whereby the phase of the output current from said coupling-transformer is dependent on the magnitude of the current at one end or another so that the negative input impulse of said amplified alternating current output, when applied to said transistors, will be in-phase with and match the intermittent pulses on one of the transistors to produce an output current from the in-phase transistor and when the inputs to the coupling-transformer are equal, no output will be produced on either relay transistor.

No references cited.

ARTHUR GAUSS, *Primary Examiner.*

S. D. MILLER, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,404,288                 October 1, 1968

Jack D. Noble et al.

It is certified that error appears in the above identified patent and that said Letters Patent are hereby corrected as shown below:

In the heading to the printed specification, lines 5 and 6, "2024 10th Ave., Oakland, Calif. 94606; said Noble assignor to said Fleming" should read -- Oakland, Calif.; said Fleming assignor to said Noble --.

Signed and sealed this 17th day of February 1970.

(SEAL)
Attest:

Edward M. Fletcher, Jr.               WILLIAM E. SCHUYLER, JR.

Attesting Officer                     Commissioner of Patents